(12) United States Patent
Reichert et al.

(10) Patent No.: US 8,985,295 B2
(45) Date of Patent: Mar. 24, 2015

(54) PARKING INTERLOCK ARRANGEMENT FOR AN AUTOMATIC TRANSMISSION

(75) Inventors: Heinz Reichert, Markdorf (DE); Gert Hanker, Meckenbeuren (DE); Ulrike Ziereisen, Markdorf (DE); Bernd Austermann, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 454 days.

(21) Appl. No.: 13/451,687

(22) Filed: Apr. 20, 2012

(65) Prior Publication Data
US 2012/0279823 A1 Nov. 8, 2012

(30) Foreign Application Priority Data
May 5, 2011 (DE) .......................... 10 2011 075 294

(51) Int. Cl.
*B60W 10/18* (2012.01)
*B60T 1/02* (2006.01)
*F16H 61/24* (2006.01)
*F16H 63/34* (2006.01)

(52) U.S. Cl.
CPC ............ *F16H 61/24* (2013.01); *F16H 63/3416* (2013.01); *F16H 2061/247* (2013.01)
USPC ......................................................... 192/219.5

(58) Field of Classification Search
USPC ........................................... 192/219.4, 219.5
See application file for complete search history.

(56) References Cited

U.S. PATENT DOCUMENTS 5,685,406 A * 11/1997 Crum et al. ................. 192/219.5
5,934,436 A * 8/1999 Raszkowski et al. ...... 192/219.5
6,994,650 B2 2/2006 Allen et al.

FOREIGN PATENT DOCUMENTS

DE     10 2004 052 869 A1   6/2005

* cited by examiner

*Primary Examiner* — Robert A Siconolfi
*Assistant Examiner* — Huan Le
(74) *Attorney, Agent, or Firm* — Davis & Bujold, PLLC; Michael J. Bujold

(57) ABSTRACT

A parking interlock arrangement for an automatic transmission of a vehicle which comprises a parking interlock gear (1) operatively connected to an output shaft and which can be locked by way of a locking pawl (2) in a shift position (P) of a notched disk (4). The notched disk (4) is connected, in a rotationally fixed manner, to a selector shaft (5). The locking pawl (2) can be actuated by way of a connecting rod (3), and the connecting rod (3) is operatively connected to the notched disk (4) by way of a coupling device in order to limit the selecting torque to be applied to the selector shaft (5).

12 Claims, 8 Drawing Sheets

PARKING INTERLOCK ARRANGEMENT FOR AN AUTOMATIC TRANSMISSION

This application claims priority from German patent application serial no. 10 2011 075 294.3 filed May 5, 2011.

FIELD OF THE INVENTION

The present invention relates to a parking interlock arrangement for an automatic transmission of a vehicle.

BACKGROUND OF THE INVENTION

For example, a parking brake mechanism for an integrated transmission and transfer case is known from the publication DE 10 2004 052 869. The parking brake mechanism for braking a drive system that transfers power to the wheels of a motor vehicle comprises a parking interlock gear, which is fastened to an output shaft. The parking interlock gear can be locked by means of a spring-loaded parking interlock pawl in a park position. The parking interlock pawl can be actuated by means of a connecting rod or parking rod, which is connected directly to a detent lever. The detent lever is operatively connected to a gear shift lever, which the driver can move into various shift positions. The motions of the shift lever are transferred to the detent lever by means of a further lever. When the detent lever is moved into the park position, the connecting rod also moves toward the parking interlock gear, so that the locking pawl is pushed into the intermediate tooth spaces of the parking interlock gear and locks the parking interlock gear in the parking position.

The direct actuation of the connecting rod by means of the notched disk or by means of the detent lever results in the disadvantage that the maximum actuating force or supporting force of the connecting rod is severely limited by the permissible shifting or selecting force or by the selector shaft torque. But the highest possible actuating force or connecting rod force is required in order to ensure the functional reliability of the parking interlock arrangement. However, for the known parking interlock arrangement, the selecting torque is thereby disadvantageously increased.

SUMMARY OF THE INVENTION

The object of the present invention is to propose a parking interlock arrangement of the initially described type for which the functional reliability is increased without increasing the required shifting force or selecting force or the required selecting torque.

Thus, a parking interlock arrangement for an automatic transmission or the like of a vehicle is proposed, comprising a parking interlock gear connected to the output; the parking interlock gear can be locked by means of a locking pawl or the like in a shift position (park position) of a notched disk connected to a selector shaft in a rotationally fixed manner so that the output shaft connected to the parking interlock gear is blocked, and thus the vehicle wheels are blocked, and the vehicle can no longer move in this shift position. For this purpose, the locking pawl can be actuated by means of a connecting rod or the like. According to the invention, the connecting rod is brought into operative connection with the notched disk by means of a coupling device.

The parking interlock actuating mechanism is thereby changed in such a way that the actuating force or the connecting rod supporting force can be set largely independently of the selecting or shifting forces or selecting torques. For example, it is possible that the selecting torque to be applied to the selector shaft is limited or reduced even if the actuating force acting on the locking pawl is simultaneously increased in order to improve the functional reliability of the parking interlock.

Within the scope of an advantageous variant embodiment, this can be realized in the design by providing the coupling device with, for example, at least one rod element or the like connected to the connecting rod, which rod element is supported on the housing so that the rod element can be moved only axially and is guided by means of a guide or the like in a corresponding opening or hole in or on the notched disk. A cam groove or the like, for example, can be provided as the hole or opening, in which cam groove a pin or roller designed as a guide is guided in order to move the rod element, which is designed as a push rod or pull rod for example, at least partially axially by means of the rotational motion of the notched disk, in particular when for example the selector shaft and thus the notched disk are moved into or out of the park position shift position P.

Due to the use of the coupling device, the supporting force acting on the connecting rod, which can occur for example during rattling on the parking interlock gear, is not transferred to the notched disk, because at least in the park position the resulting force vector on the guide guided in the opening is directed approximately at the rotational axis of the selector shaft so that no torque is applied to the selector shaft without a moment arm. By appropriately designing the opening or the guide groove on the notched disk, it is possible that the resulting force is also directed at a region below the rotational axis so that in this case even a negative torque is produced, whereby a type of self-locking can be realized. Thus, the parking interlock arrangement can be reliably held in the park position.

In order to set a desired actuating force or a connecting rod supporting force to be absorbed, a connecting rod spring, by means of which axially movable locking rollers can be stressed in order to actuate the locking pawl, is provided at the end region of the connecting rod facing the locking pawl. Thus, the connecting rod supporting force occurring in a tooth-on-tooth position between the locking pawl and the parking interlock gear is set by means of the design of the connecting rod spring. For example, a connecting rod spring having a higher pre-load and/or harder spring characteristic can be used without the required low selecting or shifting forces being increased. The functional reliability of the parking interlock arrangement is thereby significantly improved.

Furthermore, according to the next development of the invention, at least one compensating spring can be used for the coupling device. The compensating spring is used to compensate for increased connecting rod forces or actuating forces during shifting from the reverse gear shift position to the park position shift position in the event of a tooth-on-tooth position. Furthermore, the compensating spring offers force support, which otherwise would have to be provided by the selector shaft. Thus, the selecting comfort is further increased by means of the parking interlock arrangement according to the invention.

BRIEF DESCRIPTION OF THE DRAWINGS

The present invention will be explained in greater detail below with reference to the drawings. The drawings show.

DETAILED DESCRIPTION OF THE PREFERRED EMBODIMENTS

Figure 1:
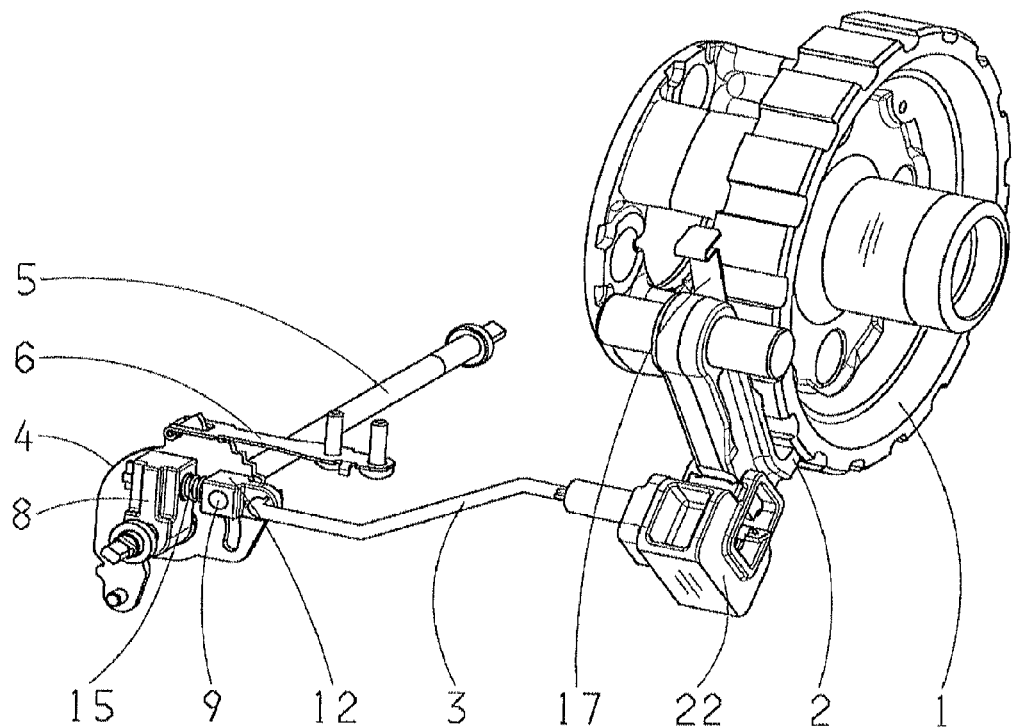
FIG. 1 a schematic, three-dimensional view of a possible variant embodiment of a parking interlock arrangement according to the invention.
Figure 2:
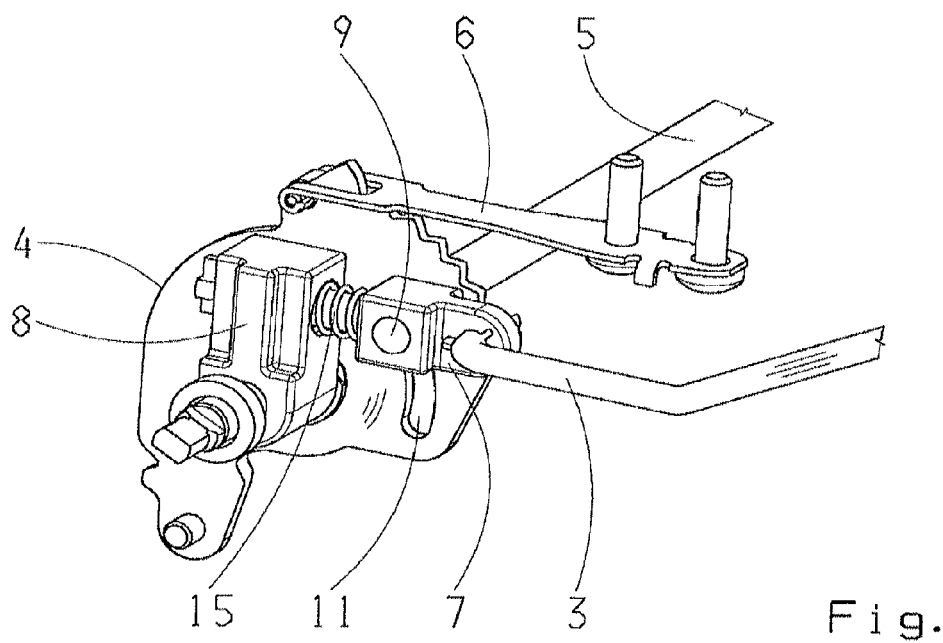
FIG. 2 an enlarged detailed view according to FIG. 1.
Figure 3:
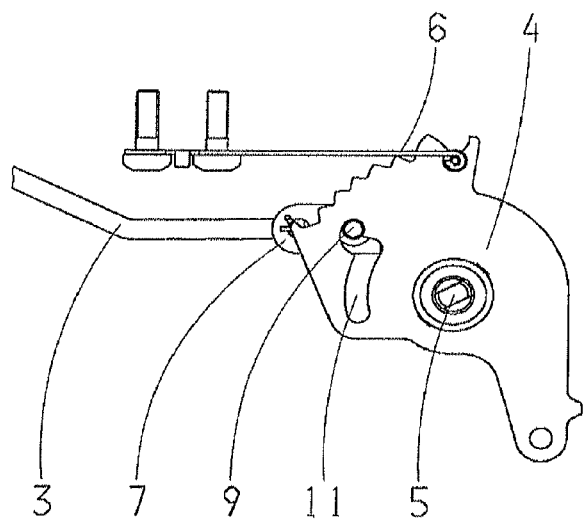
FIG. 3 an enlarged view of a notched disk of the parking interlock arrangement.
Figure 4:
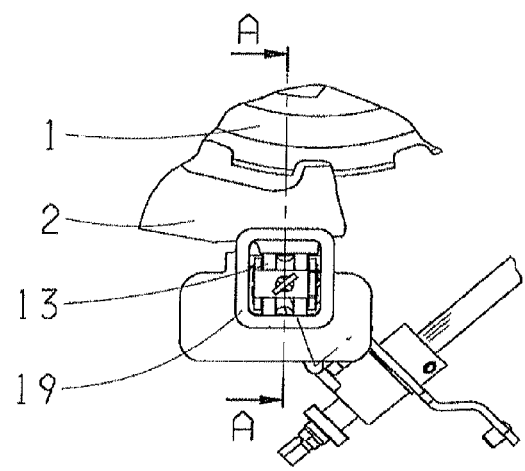
FIG. 4 a partial side view of the parking interlock arrangement according to FIG. 1.
Figure 5:
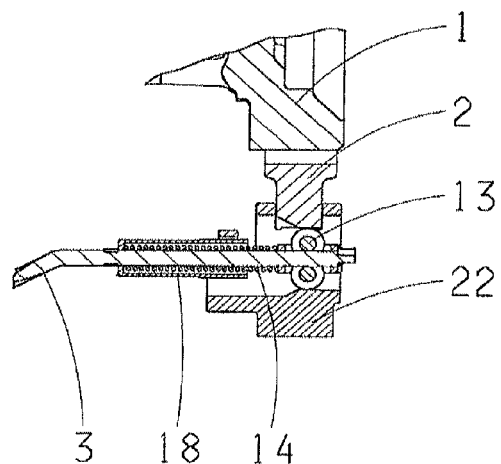
FIG. 5 a sectional view along the section line 5-5 according to FIG. 4.

In FIGS. 1 to 12, various views of a possible variant embodiment of a parking interlock arrangement according to the invention for an automatic transmission of a vehicle are shown. The parking interlock arrangement comprises a parking interlock gear 1, which is connected to an output shaft of the vehicle so that in a shift position—park position P—of a notched disk 4 connected to a selector shaft 5, the motion of the vehicle is blocked. The parking interlock gear 1 can be locked by means of a locking pawl 2 when the locking pawl 2 engages in the teeth of the parking interlock gear 1. The locking pawl 2 is spring-loaded by means of a locking pawl restraining spring 17 and is actuated by a connecting rod 3.

According to the invention, the connecting rod 3 is operatively connected to the notched disk 4 by means of a coupling device so that the selecting torque to be applied is limited, even if the actuating force acting on the locking pawl 2 is increased.

The notched disk 4 is connected in a rotationally fixed manner to a selector shaft 5, which is rotated by a selector lever of the automatic transmission according to the desired shift position P, R, N, D, 1, 2, 3, etc. Because of the rotationally fixed connection between the notched disk 4 and the selector shaft 5, the notched disk 4 is brought into the corresponding detent position against a detent spring 6.

The coupling device comprises a rod element 7 connected to the connecting rod 3; the rod element is designed as a push rod or pull rod. The rod element 7 is supported in a guide housing 8 in an axially movable manner. The guide housing 8 itself is supported on the selector shaft 5 and is fixed to the housing. Furthermore, the rod element 7 is guided by means of a guide element or a guide pin 9 in a corresponding or associated opening 11 of the notched disk 4, wherein the opening 11 is designed as a guide groove.

Figure 6:
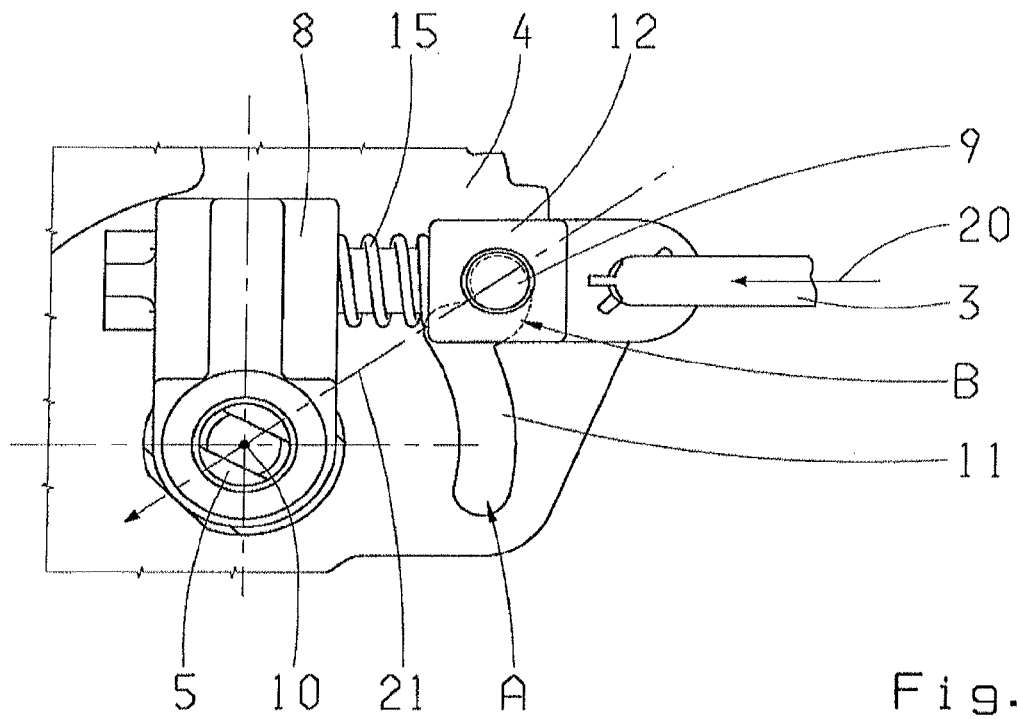
FIG. 6 an enlarged partial side view of the notched disk of the parking interlock arrangement.

As can be seen in FIG. 6 in particular, the opening 11 has a first section A for the shift positions R, N, 1, 2, 3, etc. and a second section B for the shift position P or park position. The first section A of the opening or guide groove 11 is designed or arranged on the notched disk 4 so as to be approximately arcuate in a predetermined radius with respect to the rotational axis 10 of the selector shaft 5. The second section B of the opening 11 is connected to the first section A and forms a stop region or accommodating region for the guide pin 9 in the shift position P, in other words in the park position; the stop region or accommodating region being arranged in a larger radius on the notched disk 4 than the first section A. Due to the larger radius in this shift position, the rod element 7 and thus the connecting rod 3 are moved axially in order to reach the park position P.

The guide pin 9 is guided along the opening or guide groove 11 in accordance with the applied selecting torque and the thereby resulting rotational motion of the notched disk 4 so that the rod element 7 and the connecting rod 3 fastened thereto are thereby axially moved, which can be seen in particular in the illustrations of the various shift positions according to FIGS. 9 to 12. For this motion transmission of the rotational motion of the notched disk 4 into a translational or axial motion of the rod element 7 or of the connecting rod 3, the end of the rod element 7 facing away from the locking pawl 2 is supported in the guide housing 8 in an axially movable manner and the guide pin 9 is rigidly retained in an accommodating housing 12 of the rod element 7.

Figure 7:
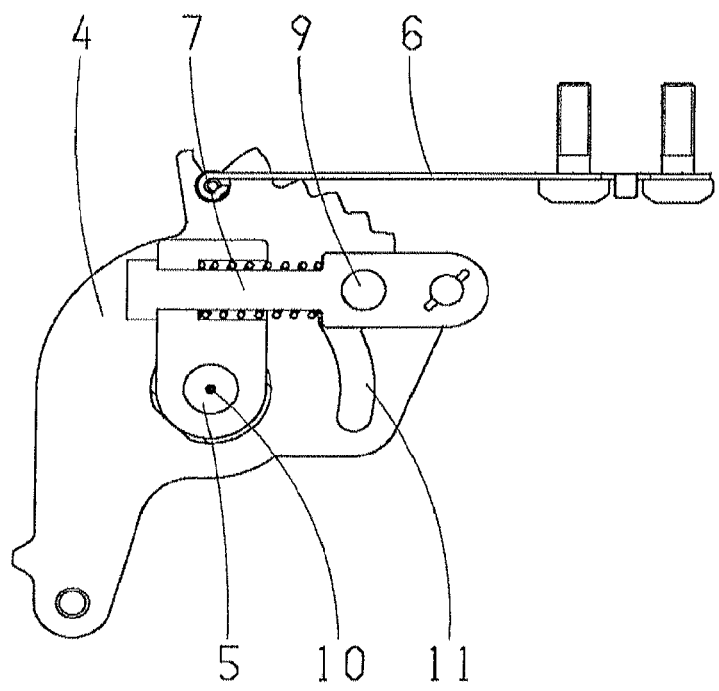
FIG. 7 a schematic side view of the notched disk of the parking interlock arrangement.
Figure 8:
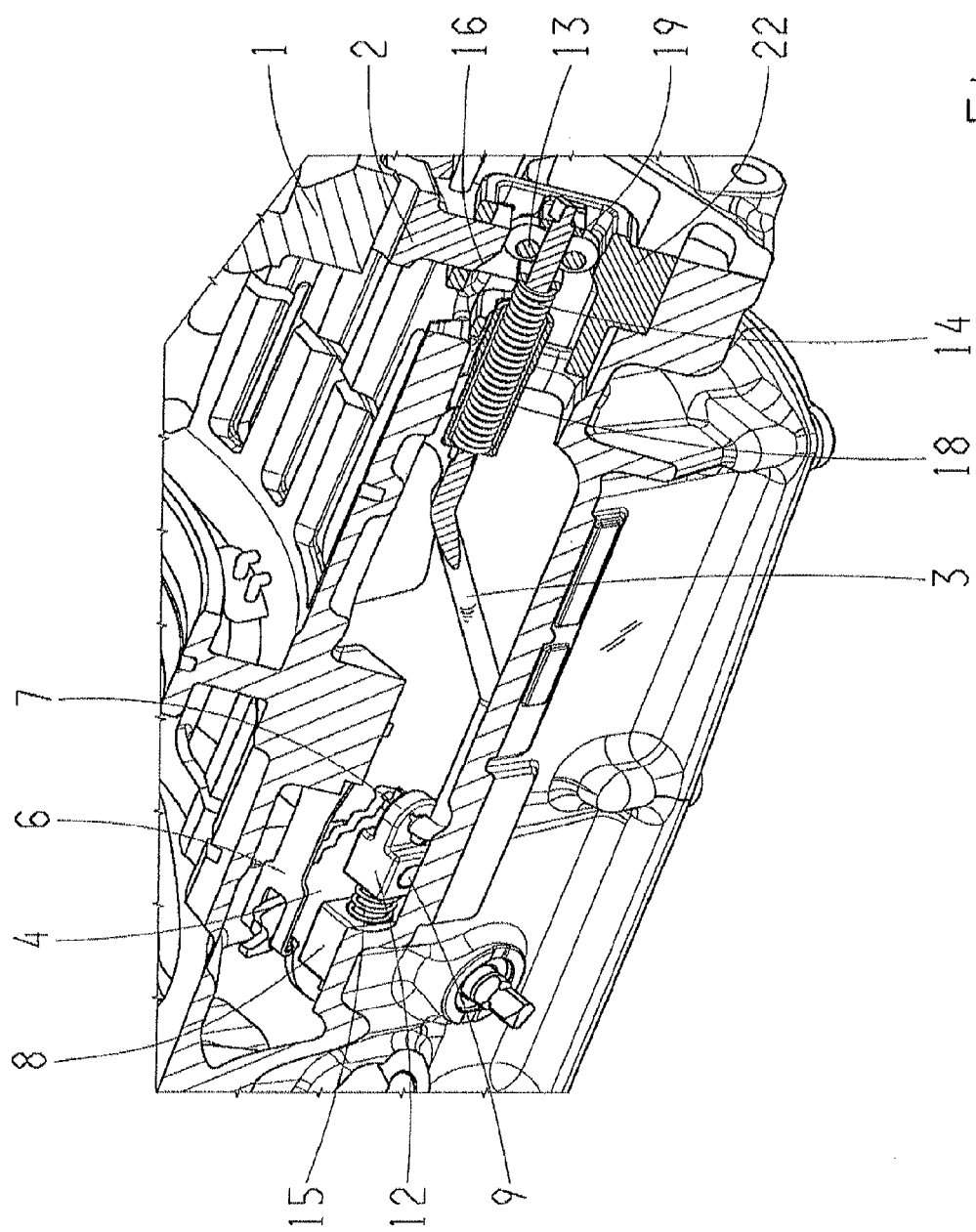
FIG. 8 a schematic, three-dimensional view of the parking interlock arrangement according to the invention in the installed state.

The connecting rod 3 is also fastened to or hooked into the accommodating housing 12, as is shown in FIGS. 6 and 7 in particular. In these Figures, it can also be seen that a compensating spring 15 is provided on the rod element 7, preferably as an option. The compensating spring 15 is preferably designed as a compression spring and lies in or on the guide housing 8 at one end and on the accommodating housing 12 at the other end. By means of the compensating spring 15, increased actuating forces or connecting rod supporting forces on the connecting rod 3 or impacts, for example in the event of a tooth-on-tooth position between the parking interlock gear 1 and the locking pawl 2, can be compensated. Furthermore, force support can also be provided by means of the compensation, whereby the selector shaft torque to be applied can be reduced.

As can be seen in FIG. 6 in particular, optimal actuation conditions of the parking interlock arrangement can be achieved by means of the coupling according to the invention between the connecting rod 3 and the notched disk 4, so that the guide pin 9 is reliably prevented from unintentionally jumping out of the park position, in other words out of the second section B of the opening 11. This is achieved in that, regardless of the acting actuating forces or connecting rod supporting forces, which are indicated by an arrow 20 in FIG. 6, even in the event of a tooth-on-tooth position, the resulting force on the guide pin 9 is directed at the rotational axis 10 of the selector shaft 5 to the extent possible, as is indicated by an arrow 21 having a dashed line in FIG. 6. Because there is no moment arm, no torque can be applied to the selector shaft 5 or to the notched disk 4, regardless of the force acting on the rod element 7 by means of the connecting rod 3. If the geometry of the opening or guide groove 11 is designed in such a way that the resulting force lies below the rotational axis 10 in FIG. 6, a type of self-locking can even be achieved due to the resulting negative torque.

The actuating force applied to the connecting rod 3 by means of the notched disk 4 and the rod element 7 in order to engage the park position P is transferred to locking rollers 13 supported in an axially movable manner on the end region of the connecting rod 3 facing the locking pawl 2, and thus also to the locking pawl 2. The locking rollers 13 are supported by means of the locking roller housing 19 thereof on the connecting rod 3 and lie against a connecting rod spring 14, which is axially supported in a stop sleeve 18. A guide block or a guide unit 22 accommodates the locking rollers 13 in the locking roller housing 19 thereof and the locking pawl 2, among other things. The connecting rod 3, together with the connecting rod spring 14 and the stop sleeve 18, are also at least partially accommodated in the guide block 22.

Figure 11:
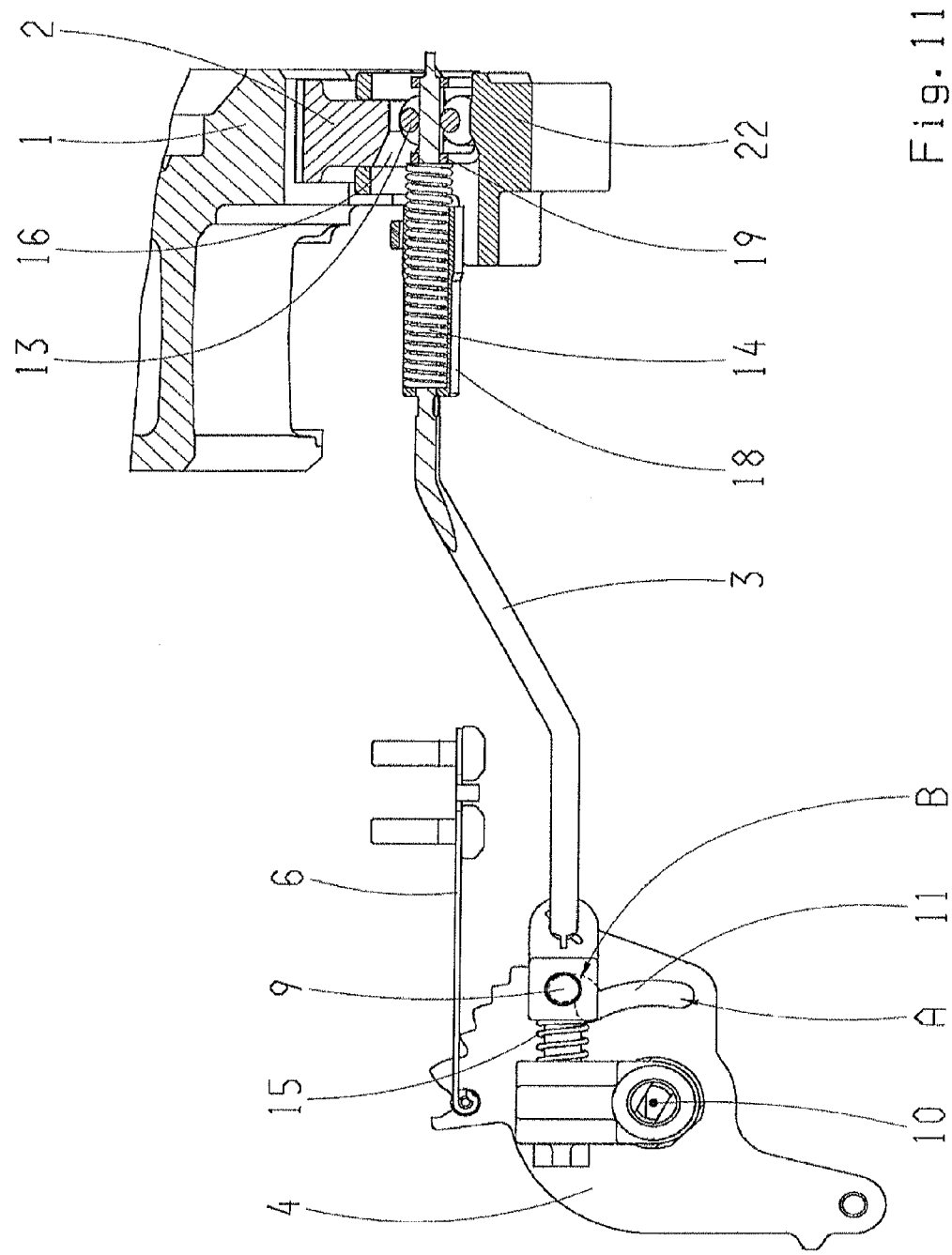
FIG. 11 a schematic, partial sectional view of the parking interlock arrangement in a shift position P with a tooth-in-space position.

If the connecting rod 3 is then moved in the direction of the locking pawl 2 in order to engage the park position P, the locking rollers 13 strike an inclined surface or locking ramp 16 of the locking pawl 2 so that the locking pawl 2 is moved into the teeth of the parking interlock gear 1. If a tooth-on-space position is reached, as shown in FIG. 11 in particular, the locking rollers 13 have overcome the locking ramp 16 and the locking pawl 2 is in engagement with the teeth of the parking interlock gear 1. However, if there is a tooth-on-tooth position, the locking rollers 13 do not overcome the locking ramp 16, so that further motion of the locking rollers 13 is initially prevented for the time being due to the connecting rod spring 14 being stressed accordingly.

Figure 9:
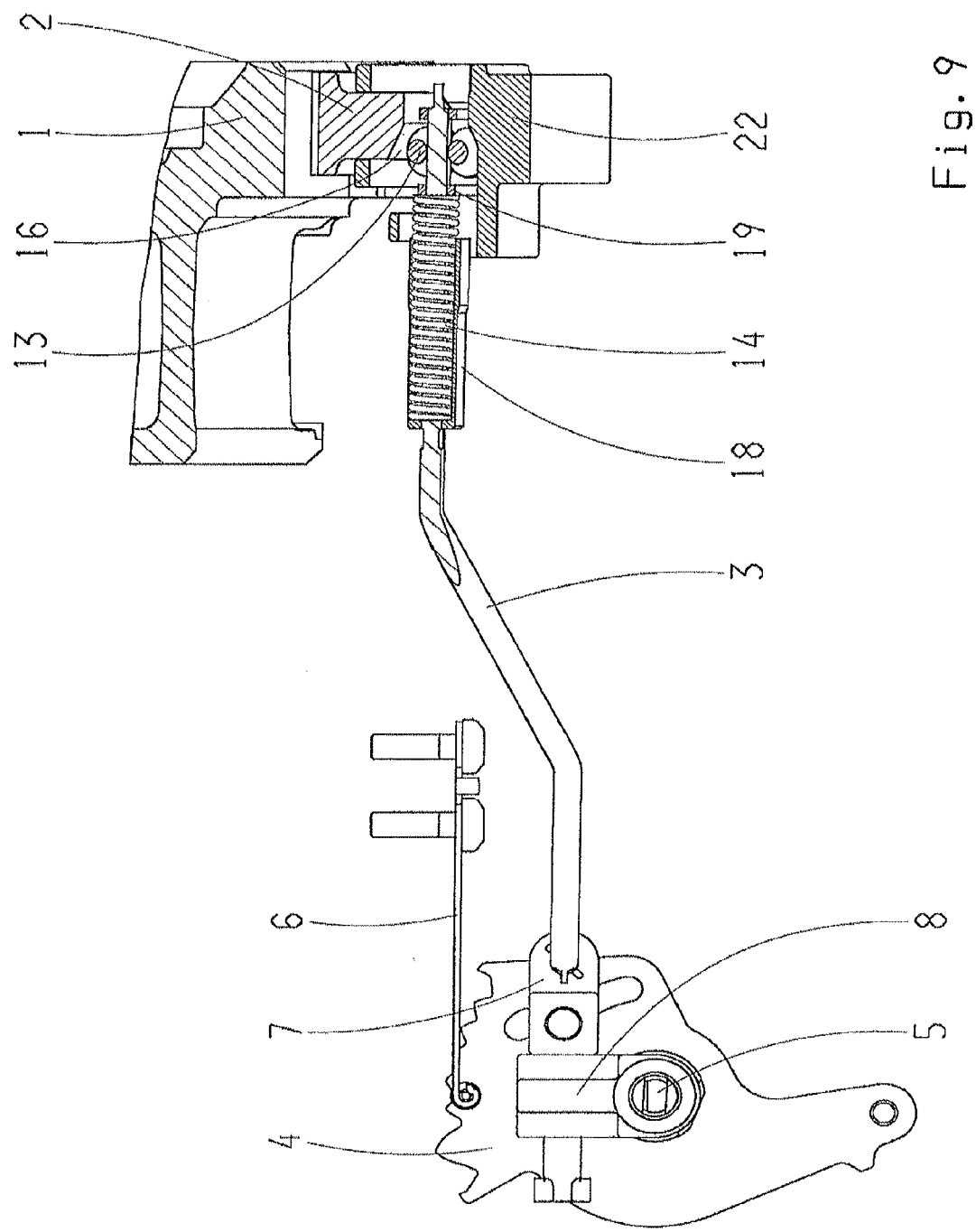
FIG. 9 a schematic, partial sectional view of the parking interlock arrangement in a shift position D.

The shift position D (forward gear) is shown in FIG. 9 for the parking interlock arrangement according to the invention so as to represent shift positions N, 1, 2, 3. In the shift position D, the notched disk 4 is in a center detent position of the detent spring 6. In this rotational position of the notched disk 4, the guide pin 9 is arranged in the opening 11 of the notched disk 4 in the first arcuate section A of the opening 11 so that the rod element 7 is in a left stop position in the drawing plane together with the connecting rod 3, whereby the locking rollers 13 are against the locking ramp 16 of the locking pawl 2, whereby the locking pawl 2 is not in engagement with the teeth of the parking interlock gear 1.

Figure 10:
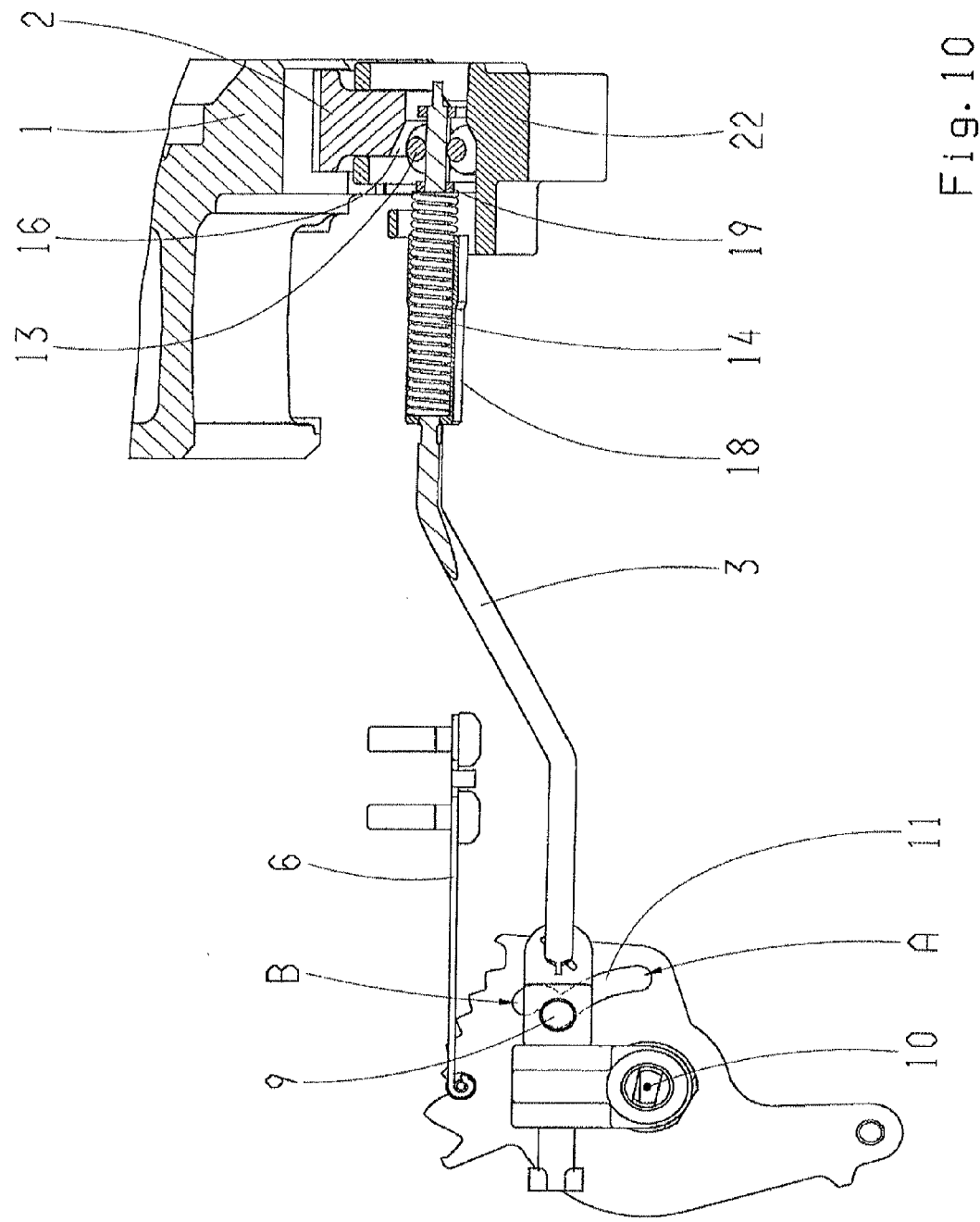
FIG. 10 a schematic, partial sectional view of the parking interlock arrangement in a shift position R.

In FIG. 10, the shift position R (reverse gear) is shown for the parking interlock arrangement. In the shift position R, the guide pin 9 is at the end of the arcuate first section A of the opening 11, because the notched disk 4 is held in a left detent position just before the parking position P by means of the detent spring 6. Likewise in this shift position R, the locking rollers 13 are against the locking ramp 16 of the locking pawl 2, so that parking interlock gear 1 is not in engagement with the locking pawl 2.

In FIG. 11, the shift position P (park position) is shown for the parking interlock arrangement. In the shift position P, the notched disk 4 is in the outermost left detent position, which corresponds to the park position P. Thus, the guide pin 9 is arranged in the accommodating region of the second section B of the opening 11, whereby the rod element 7 is moved to the right in the drawing plane, so that the connecting rod 3 is likewise moved to the right, so that the locking rollers 13 overcome the locking ramp 16 of the locking pawl 2 and thus the locking pawl 2 enters the teeth of the parking interlock gear 1. Thus, the parking interlock gear 1 is blocked by the locking pawl 2. The vehicle can no longer move, because the locking pawl 2 is in a tooth-in-space position.

Figure 12:
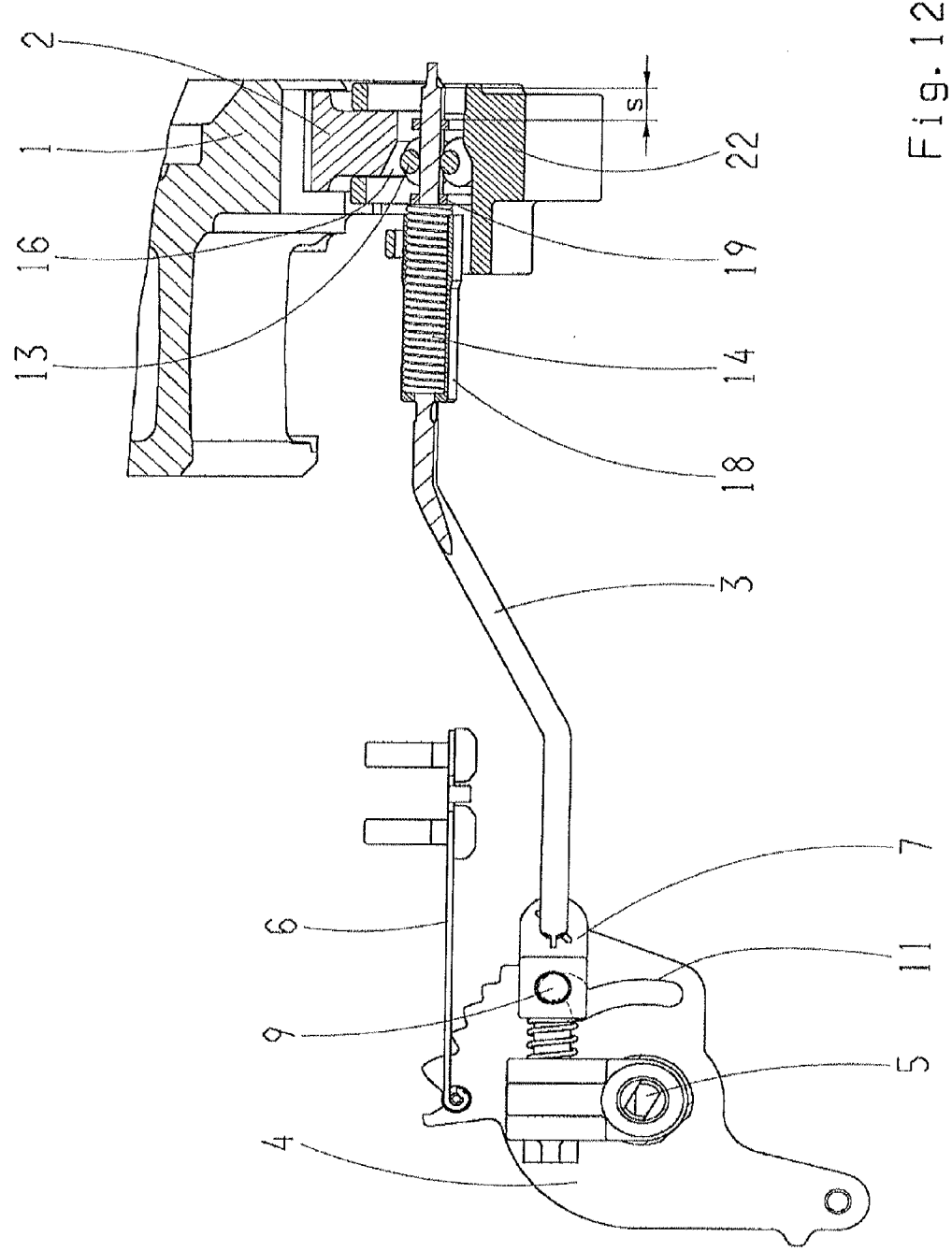
FIG. 12 a schematic, partial sectional view of the parking interlock arrangement in the shift position P with a tooth-on-tooth position.

Finally, the shift position P (park position) is shown in FIG. 12, wherein the locking pawl 2 and the parking interlock gear 1 are in a tooth-on-tooth position, however. In contrast with the shift position illustrated in FIG. 11, the locking rollers 13 are still against the locking ramp 16, because the locking pawl 2 cannot be brought into engagement with the teeth of the parking interlock gear 1 because of the tooth-on-tooth position. However, because only the connecting rod 3 is moved further and the locking rollers 13 remain in their position, the spring displacement S indicated in FIG. 12 results for the connecting rod spring 14. Because the locking rollers 13 cannot be moved further, a spring force is produced in the connecting rod spring 14, which in turn causes a connecting rod supporting force on the rod element 7 by means of the connecting rod 3. This produces a resulting force on the guide pin 9, as shown in FIG. 6 by the arrow 21, which is directed approximately at the rotational axis 10 of the selector shaft 5.

Thus, the force resulting from the tooth-on-tooth position does not have an effect on the notched disk 4 or on the selector shaft 5. As soon as the tooth-on-tooth position can be resolved, the locking pawl 2 is moved into the intermediate space of the teeth of the parking interlock gear 1 by the spring force of the connecting rod spring 14.

The design of the connecting rod spring 14 ensures that the parking interlock gear 1 is not locked until the rotational speed of the output shaft or of the parking interlock gear 1 is below a predetermined rotational speed, so that the functional reliability is optimized and misuse attempts in which an attempt is made to engage the parking interlock while driving or on a grade are prevented.

REFERENCE CHARACTERS 1 parking interlock gear
2 locking pawl
3 connecting rod
4 notched disk
5 selector shaft
6 detent spring
7 rod element
8 guide housing
9 guide pin
10 rotational axis
11 opening or guide groove
12 accommodating housing
13 locking rollers
14 connecting rod spring
15 compensating spring
16 locking ramp
17 locking pawl restraining spring
18 stop sleeve
19 locking roller housing
20 arrow or connecting rod supporting force
21 arrow or resulting force
22 guide block
A first section of the opening
B second section of the opening
S spring displacement of the connecting rod spring in the event of tooth-on-tooth position
P park position shift position
R reverse gear shift position
D forward gear shift position

The invention claimed is:
1. A parking interlock arrangement for an automatic transmission of a vehicle, the parking interlock arrangement comprising:
a parking interlock gear (1) which is operatively connected to an output shaft and which is lockable by a locking pawl (2) in a shift position (P) of a notched disk (4) that is connected in a rotationally fixed manner to a selector shaft (5),
the locking pawl (2) being actuatable by a connecting rod (3), and
the connecting rod (3) being operatively connected to the notched disk (4) by a coupling device in order to limit a selecting torque to be applied to the selector shaft (5),
wherein the coupling device comprises a rod element (7) that is connected to the connection rod (3), the rod element (7) is supported, in an axially movable manner, by a guide housing (8), and the rod element (7) is guided by a guide element in an associated opening (11) of the notched disk (4).

2. The parking interlock arrangement according to claim 1, wherein the is retained within an accommodating housing (12) of the rod element (7).

3. The parking interlock arrangement according to claim 1, wherein an end of the connecting rod (3), facing away from the locking pawl (2), is connected to an end of the rod element (7) facing the locking pawl.

4. The parking interlock arrangement according to claim 1, wherein at least one compensating spring (15) compensates for axial motion of the rod element (7).

5. The parking interlock arrangement according to claim 4, wherein the at least one compensating spring (15) is a compression spring, and a first end of the compression spring abuts against the guide housing (8) and a second end of the compression spring abuts against an accommodating housing (12) of the guide element.

6. The parking interlock arrangement according to claim 1, wherein an end region of the connecting rod (3), facing the locking pawl (2), is equipped with axially movable locking rollers (13), which are operatively connected to a corresponding locking ramp (16) of the locking pawl (2), depending on the axial motion of the connecting rod (3), in order to bring the locking pawl into engagement with the parking interlock gear (1) against a force of a locking pawl restraining spring (17).

7. The parking interlock arrangement according to claim 6, wherein a connecting rod spring (14) is stressed by the locking rollers (13), supported in an axially movable manner on the connecting rod (3), when a tooth-on-tooth position between the locking pawl (2) and the parking interlock gear (1) exists.

8. The parking interlock arrangement according to claim 7, wherein a first end of the connecting rod spring (14) abuts against an axially fixed stop sleeve (18) of the connecting rod (3), and a second end of the connecting rod spring (14) abuts against a locking roller housing (19).

9. The parking interlock arrangement according to claim 1, wherein the associated opening (11) comprises a first section (A), for first shift positions ®, N, 1, 2, 3), and a second section (B), for another shift position (P), so that a connecting rod supporting force, acting on the guide element in the second section (B) in the shift position (P), is directed approximately at a rotational axis (10) of the selector shaft (5).

10. The parking interlock arrangement according to claim 9, wherein the first section (A) is disposed on the notched disk (4) so as to be approximately arcuate and have a predetermined radius with respect to the rotational axis (10) of the selector shaft (5), and the second section (B) comprises an accommodating region, connected to the first section (A) that is disposed on the notched disk (4) at a greater radius than the first section (A).

11. The parking interlock arrangement according to claim 9, wherein the guide element is a guide pin (9) which is guided in the associated opening (11), of the notched disk (4), along the first and the second sections (A, B) depending on an applied selecting torque such that rotational motion of the notched disk (4) is converted into axial motion of the connecting rod (3) depending on the selected shift position.

12. A parking interlock arrangement for an automatic transmission of a vehicle, the parking interlock arrangement comprising:
   a parking interlock gear (1) being functionally coupled to an output shaft of the vehicle, and the parking interlock gear (1) being locked by a locking pawl (2) for preventing rotation of the output shaft when a notched disk (4) is located in a parking position (P);
   the notched disk (4) being rotatably secured to a selector shaft (5) such that the notched disk (4) being preventable from rotating with respect to selector shaft (5);
   the locking pawl (2) being actuated by a connecting rod (3) functionally connected, via a coupling device, to the notched disk (4) for limiting a selecting torque applied to the selector shaft (5); and
   the coupling device comprising a rod element (7) connected to the connecting rod (3), the rod element (7) being supported, in an axially movable manner, within a guide housing (8), the rod element (7) being guided by a guide element in an associated opening (11) of the notched disk (4) and the guide element being retained within an accommodating housing (12) of the rod element (7).

* * * * *